(12) United States Patent
Kaczorowski et al.

(10) Patent No.: US 12,068,779 B2
(45) Date of Patent: Aug. 20, 2024

(54) FIBRE-OPTIC MEASUREMENT SYSTEM, METHOD OF ADAPTATION OF THE COMMUNICATION OPTICAL FIBRE INTO A MEASUREMENT SYSTEM, AND FIBRE-OPTIC MEASUREMENT AND COMMUNICATION SYSTEM

(71) Applicant: INPHOTECH SPOLKA Z OGRANICZONA ODPOWIEDZIALNOSCIA, Oltarzew (PL)

(72) Inventors: Jakub Kaczorowski, Marki (PL); Krzystof Markiewicz, Warsaw (PL); Lukasz Szostkiewicz, Torun (PL); Alejandro Dominguez-Lopez, Granada (ES); Marek Napierala, Warsaw (PL); Tomasz Nasilowski, Warsaw (PL)

(73) Assignee: INPHOTECH SPOLKA Z OGRANICZONA ODPOWIEDZIALNOSCIA, Oltarzew (PL)

(*) Notice: Subject to any disclaimer, the term of this patent is extended or adjusted under 35 U.S.C. 154(b) by 28 days.

(21) Appl. No.: 17/561,372

(22) Filed: Dec. 23, 2021

(65) Prior Publication Data
US 2022/0123835 A1    Apr. 21, 2022

Related U.S. Application Data

(63) Continuation-in-part of application No. PCT/IB2020/056069, filed on Jun. 26, 2020.

(51) Int. Cl.
*H04B 10/079* (2013.01)
*H04B 10/25* (2013.01)

(52) U.S. Cl.
CPC . *H04B 10/07957* (2013.01); *H04B 10/07953* (2013.01); *H04B 10/25* (2013.01)

(58) Field of Classification Search
CPC .............. H04B 10/07957; H04B 10/25; H04B 10/2581; H04B 10/07; H04B 10/071;
(Continued)

(56) References Cited

U.S. PATENT DOCUMENTS 8,520,197 B2   8/2013  Handerek
10,502,897 B2  10/2019 Szostkiewicz et al.
(Continued)

FOREIGN PATENT DOCUMENTS

CA    2725353    3/2016
JP    2016080600 5/2016
(Continued)

OTHER PUBLICATIONS

Lu, Xin, "Coherent Rayleigh time domain reflectometry: novel applications for optical fibre sensing", Thesis No. 7104, Ecole Polytechnique Federale de Lausanne, Sep. 26, 2016, pp. 1-135.
(Continued)

*Primary Examiner* — Hibret A Woldekidan
(74) *Attorney, Agent, or Firm* — The Concept Law Group, PA; Scott D. Smiley; Scott M. Garrett

(57) ABSTRACT

A fibre-optic measurement system equipped with a controlled light generation system (1) and a receiving system (2) connected via an optical path which comprises a directional device (4) and which, in addition, has a processing unit (9) for controlling the light generation system (1) and for receiving and processing the signal from the receiving system (2), according to the invention, it is characterized by the fact that it has a selective mode device (5) and is adapted to be connected to a fibre-optic telecommunications network by a selective mode device (5) and the processing unit (9) is
(Continued)

adapted to implement the OFDR and/or COTDR measurement technique for measuring changes in the optical distance and processing them into one or more parameters. Moreover, the object of the invention is also the method of adaptation of a telecommunications network into a sensor network and a fibre-optic measurement and communication system.

15 Claims, 6 Drawing Sheets

(58) Field of Classification Search
CPC .. H04B 10/075; H04B 10/50; H04B 10/0795; H04B 10/07953; H04J 14/04; H04J 14/0202; H04J 14/02; G01H 9/004; G02B 6/0288; G02B 6/02047; G02B 6/02042
See application file for complete search history.

(56) References Cited

U.S. PATENT DOCUMENTS

| | | | |
|---|---|---|---|
| 2009/0097015 A1 | 4/2009 | Davies et al. | |
| 2009/0304322 A1* | 12/2009 | Davies | G01H 9/004 385/12 |
| 2014/0180075 A1* | 6/2014 | Kulkarni | A61B 3/12 356/450 |
| 2019/0049675 A1* | 2/2019 | Szostkiewicz | G02B 6/2552 |
| 2019/0199440 A1* | 6/2019 | Gross | H04J 14/0202 |
| 2020/0096322 A1* | 3/2020 | Marsden | G01B 11/16 |

FOREIGN PATENT DOCUMENTS

| | | |
|---|---|---|
| WO | 2009148824 | 12/2009 |
| WO | 2017184004 | 10/2017 |

OTHER PUBLICATIONS

Ding, Zhenyang, et al., "Distributed Optical Fiber Sensors Based on Optical Frequency Domain Reflectometry: A review", Sensors 18, No. 4, Published on Apr. 3, 2018, pp. 1-31.

Xu, Pengbai, et al., "Bend-insensitive distributed sensing in singlemode-multimode-singlemode optical fiber structure by using Brillouin optical time-domain analysis", Optics Express, 23, No. 17, Aug. 20, 2015, pp. 1-9.

Koyamada, Yahei, et al., "Fiber-optic distributed strain and temperature sensing with very high measurand resolution over long range using coherent OTDR", Journal of Lightwave Technology, vol. 27, No. 9, May 1, 2009, pp. 1142-1146.

Chorchos, L., et al., "Passive higher order mode filter for 850 nm multimode fiber transmission." Microwave and Optical Technology Letters 59.8 (2017): pp. 1959-1962.

Huang, Quandong, et al., "Mode multiplexer with cascaded vertical asymmetric waveguide directional couplers." Journal of Lightwave Technology vol. 36, No. 14 (Jul. 2018): pp. 2903-2911.

Yoshikawa, Manubu, et al., "Single-mode separation for mode-division multiplexing by holographic filter", IEICE Transactions on Electronics vol. 77, No. 9 (1994): pp. 1526-1527.

\* cited by examiner

FIBRE-OPTIC MEASUREMENT SYSTEM, METHOD OF ADAPTATION OF THE COMMUNICATION OPTICAL FIBRE INTO A MEASUREMENT SYSTEM, AND FIBRE-OPTIC MEASUREMENT AND COMMUNICATION SYSTEM

CROSS-REFERENCE TO RELATED APPLICATION

This application claims priority to PCT Application No. PCT/IB2020/056069, filed on Jun. 26, 2020, and to its priority application, Polish Patent Application No. PL430406, filed on Jun. 28, 2019, the entirety of each of which are hereby incorporated by reference.

TECHNICAL FIELD

The object of the invention is a fibre-optic measurement system, method of adaptation of the communication optical fibre into a measurement system, and fibre-optic measurement and communication system intended, and in particular a system for distributed measurements based on Rayleigh scattering.

BACKGROUND OF THE DISCLOSURE

The state of the art of fibre optic measurement and sensing systems includes distributed system solutions used to measure temperature, strain, or pressure based on changes in effective refractive index or in optical distance. These are systems based on Coherent Optical Time Domain Reflectometry (COTDR) and/or Optical Time Domain Reflectometry (OFDR) techniques. These solutions are based on single-mode solutions due to difficulties with detection of signal from multi-mode optical fibres. Single-mode optical fibres have power limitations due to non-linear effects that increase with the magnitude of the optical power propagated in the optical fibre.

The COTDR technique is also called fi-OTDR, phi-OTDR and φ-OTDR (phase-sensitive OTDR). All of these names refer to a single architecture of a measurement device in which phase measurement is based on sending coherent light pulses and analyzing the signal that is reflected back in the time domain. The name COTDR emphasizes the coherent nature of the measurement signal. The name φ-OTDR draws attention to the possibility of performing a quantitative measurement of phase changes in the optical fibre. Both of these names can be used interchangeably. For example, the names are used interchangeably in the article "Coherent Rayleigh time domain reflectometry: novel applications for optical fibre sensing," Xin LU, EPFL 2016, https://infoscience.epfl.ch/record/221427, and in "Bend-insensitive distributed sensing in singlemode-multimode-singlemode optical fiber structure by using Brillouin optical time-domain analysis," 9 (2015) by P. Xu, Y. Dong, J. Zhang, D. Zhou, T. Jiang, J. Xu, H. Zhang, T. Zhu, Z. Lu, and L. Chen.

In order to determine effective refractive index optical distance as a function of length of optical fibre or, Optical Frequency Domain Reflectometry is also used in the state of the art when analysing signals reflected or scattered along the optical fibre: Ding, Zhenyang, et al. "Distributed Optical Fibre Sensors Based on Optical Frequency Domain Reflectometry: A review." Sensors (Basel, Switzerland) 18 (2018): 104-127.

Currently used multi-mode optical fibres allow for transmission of more than one hundred modes. Differences in light propagation speed between modes and their spatial distribution are main factors that make distributed optical measurements using the COTDR technique in its typical form impossible to carry out with the use of multi-mode optical fibres.

Canadian Patent application CA2725353C discloses an Optical Time Domain Reflectometry (OTDR) system, that is configured to measure backscattering from multi-mode optical fibres. The system uses a single spatial mode filtering system to select a single Rayleigh backscattering circle produced in response to an optical pulse introduced into a multi-mode optical fibre. The selected single speckle can be used to perform a distributed vibration measurement.

U.S. Pat. No. 8,520,197 B2 discloses a distributed optical fibre system in which the sensing optical fibre comprises at least a first and second waveguide used for separate vibration measurement operations. According to the contents of this document, a sensing optical fibre can be a twice-laid optical fibre with a single-mode core and a multi-mode inner cladding. International Patent Publication No. WO2009148824 discloses an optical time domain reflectometry (OTDR) system configured to detect Rayleigh backscatter reflected from a multimode sensing optical fiber. The system includes a single spatial mode filtering system to select a single speckle of the Rayleigh backscatter produced in response to an optical pulse launched into the multimode fiber. The detected single speckle may be used for distributed disturbance (vibration) detection. U.S. Patent Pub. No. US20090097015 discloses a setup to measure a characteristic of a multimode optical fiber in which a light pulse source produces a light pulse for transmission into the multimode optical fiber. A spatial filter passes a portion of Brillouin backscattered light from the multimode optical fiber that is responsive to the light pulse. Optical detection equipment detects the portion of the Brillouin backscattered light passed by the spatial filter. Japanese Patent No. JP2016080600A discloses a solution to a problem of accurate measurement of an amount of strain in a multimode fiber and offers a measurement method of an optical fiber for measuring strain of an optical fiber to be measured includes the steps of: inputting test light as light of a basic mode to an optical fiber to be measured and measuring Brillouin scattering light of a basic mode that is generated in the optical fiber to be measured resulting from the test light. Preferably, probe light having a wavelength corresponding to a wavelength of the Brillouin scattering light Br is inputted to the optical fiber to be measured, while the test light is input as pump light thereto.

Single-mode optical fibres are used in telecommunications for long-distance signal transmission—on the order of several, several dozen, or even several hundred kilometres. Optical fibres used in such systems are well insulated and protected to avoid signal losses and crosstalk. As a result of these protections, they do not work well as sensors.

Known fibre-optic measurement systems generally use single-mode sensing optical fibre with small core diameters, use of which involves limiting the maximum power of the source due to non-linear phenomena in the optical fibre structure. As a consequence, the maximum measurement distance is limited by the maximum power that does not cause non-linear phenomena. Additionally, measurement systems dedicated to single-mode optical fibres do not work well with multi-mode sensing optical fibres due to a decrease in visibility of the measured signal. This is an inconvenience because nowadays multi-mode communication optical fibres are routinely installed during the construction of buildings and infrastructure.

SUMMARY OF THE DISCLOSURE

The objective of the invention is to provide a measurement system, a method of adaptation of telecommunications network and a measurement and communication system providing the possibility of measuring physical quantities by using multi-mode optical fibres used in short-range telecommunications networks, particularly indoor or inter-building networks, as measuring optical fibres.

A fibre-optic measurement system equipped with a controlled light generation system and a receiving system connected via an optical path which comprises a directional device and which, in addition, has a processing unit for controlling the light generation system and for receiving and processing the signal from the receiving system, according to the invention, is characterized by the fact that it has a selective mode device and is adapted to be connected to a fibre-optic telecommunications network by a selective mode device and the processing unit is adapted to implement the OFDR or the COTDR measurement technique for measuring changes in the optical distance and processing them into one or more parameters, in particular temperature and/or strain. A selective mode device ensures sufficient visibility of the measurement signal. The OFDR and the COTDR techniques provide the possibility of measuring physical quantities such as temperature, pressure, strain, as a function of the length of the measuring optical fibre. The measurement system according to the invention connected to an existing network on a multi-mode optical fibre enables it to be used as a sensing optical fibre.

Preferably, the selective mode device is a mode filter and, in particular, a device to selectively increase the losses of higher-order modes, such as those disclosed in U.S. Ser. No. 10/502,897B2.

Preferably, the selective mode device is a selective mode excitation system. Such system facilitates the measurement of two parameters simultaneously using different modes.

A selective mode device is preferably a holographic plate or a sequence of holographic plates. Such solution ensures low losses of light input into the optical fibre and ensures a relative freedom with respect to the number of addressed modes. There are known solutions for addressing from several to several dozen modes independently. Alternatively, the selective mode device is an asymmetrical coupler system.

Preferably, the processing unit is equipped with a frequency filtering module for filtering the measurements results of optical distance changes. Such a solution allows the system to separate optical distance changes caused by a fast-changing variables, such as vibrations, from the optical distance changes caused by a slow-changing variables, such as temperature, and consequently allows to measure them simultaneously.

Preferably, the selective mode device is controlled and connected to a processing unit and is adapted to successive excitation of modes of different orders, while the processing unit is adapted to determining two parameters, in particular temperature and strain, in the measurement by means of at least two modes of different orders.

Even more preferably, the processing unit is adapted to determining two parameters, in particular temperature and stress, in the measurement by means of at least three modes of different orders. This allows for an overdetermined system of equations and reduces the error.

Preferably, the fibre-optic measurement system is equipped with a coupler and a section of optical fibre to connect it to the telecommunications network. This allows the system to be plugged in to the network even if the free end of the optical fibre is not available.

A method of adaptation of a telecommunication optical fibre having a core diameter greater or equal 20 µm, into a measurement system, according to the invention is distinguished in that the telecommunication optical fibre is connected via selective mode device to an optical path of the measurement system having a controlled light generation system and a receiving system connected by means of a directional device. The use of optical fibre with a core diameter of 20 µm or more facilitates obtaining sufficient measurement maximal distance and facilitates the excitation of measurement modes.

Preferably, the optical fibre section in an existing fibre-optic network is connected to the fibre-optic measurement system according to the invention, and the optical fibre of the telecommunications network is cut and connected to the coupler.

Preferably, the fibre-optic measurement and communication system for data transmission and for the determination of a parameter representing a physical quantity, particularly when selected from the group that comprises temperature and strain, comprises at least one fibre-optic measurement system according to the invention attached to a telecommunications network equipped with a transmitter and receiver connected to an optical fibre with a core of more than 20 µm in diameter, and the transmitter wavelength varies from the wavelength of the light generation system by at least 10 nm.

Preferably, the optical fibre of the telecommunications network has a core diameter of more than 47 µm. This allows for a larger mode field and the possibility to work with more power while avoiding non-linear phenomena.

Preferably, the transmitter operates at a wavelength below 900 nm and the light generation system at a wavelength over 1000 nm. This allows the use of detectors with different wavelength-sensitivity relationships and a better separation of measurement and communication signals.

The sensor, according to the invention, enables the measurement of changes in the refractive index—changes in optical distance—in a distributed manner. By measuring changes in the optical distance, it is possible to determine changes in temperature or strain of a multi-mode optical fibre by means of the techniques described above. This solution adds new functionality to the existing and installed multi-mode optical fibres and is important in the context of the development of SMDM (Spatial Mode Division Multiplexing) techniques, which may lead to an increased use of few- and multi-mode optical fibres in long-distance data transmission lines.

Using the invention, one can measure differences in propagation constants between different modes. This enables measurement of the quality of the optical fibre in a distributed manner, i.e. assessing whether and to what extent the parameters are maintained along its length, not just an average from the entire length of a section on which the measurement is conducted.

The structure of the measurement system and the measurement and communication system limits the influence of non-linear phenomena occurring in such measurements. The limitation allows the increase of the system's input power and consequently increases the maximal distance of the measurement system. For example, for a single-mode optical fibre length over 50 km, the transmission losses are too high and measurement is not possible because of the noise, while increasing the input power leads to occurrence of the non-linear phenomena that also make measurement impossible. The use of the proposed system allows for increase of power without generating non-linear phenomena and, as a result, increase of the maximum measurement reach.

Preferably, the light generation system has optical power greater than or equal to 5 dBm and more preferably greater than 20 dBm, which enables sufficient sensitivity to be achieved over the entire area of the intra-building or inter-building network.

BRIEF DESCRIPTION OF THE DRAWINGS

The object of the invention is described as embodiments in the drawing where.

DETAILED DESCRIPTION

Figure 1A:
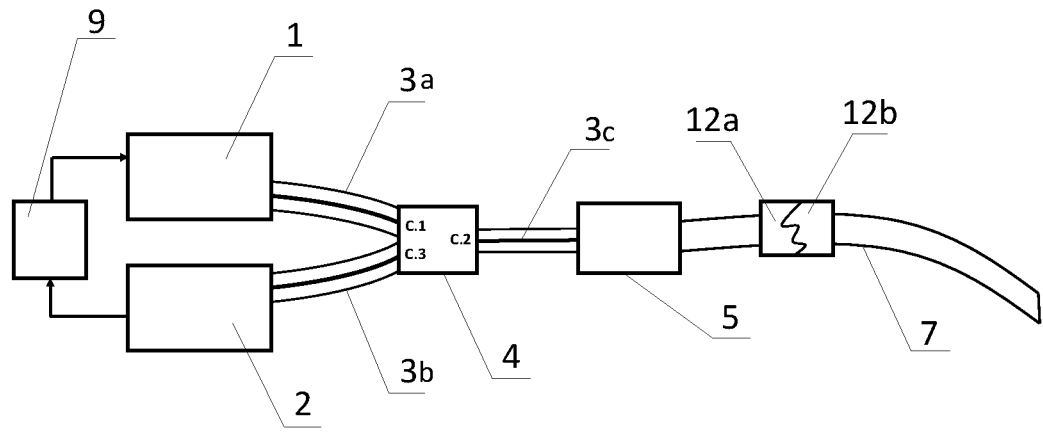
FIG. 1A shows a block diagram of an embodiment of a fibre-optic measurement system according to the invention.

The block diagram of a fibre-optic measurement system according to some embodiments adapted for connecting to a telecommunications network socket is shown in FIG. 1A. Illustrated in FIG. 1A, a fibre-optic measurement system comprises the controlled light generation system 1 and the receiving system 2 connected via an optical path. The optical path comprises a directional device 4 which is a circulator connected by single-mode optical fibres 3a, 3b to the light source 1 and the receiving system 2. The circulator output is connected via the single-mode optical fibre 3c to the selective mode device 5. The selective mode device is equipped with the plug 12a connected to the telecommunications network socket 12b. The connection of the plug and socket results in the connection to the telecommunications network of a fibre-optic measurement device according to the embodiment of the invention. Connection to an existing network with a multi-mode optical fibre enables this optical fibre to be used as the sensing optical fibre 7.

This solution is particularly convenient when the optical fibre, which is a part of the network, is laid in an accessible place and terminated with a standard fibre-optic connector, for example FC, SC, E200, LC or another standard connector.

In this case, the output of the selective mode device 5 can be connected directly to the available end of the optical fibre 7, which is a part of a network, or to an appropriate socket 12a, 12b in the existing network infrastructure. If the optical fibre 7 is used to carry out data transmission, wavelength division multiplexer (WDM) couplers can be used to separate the measurement signal generated by the light generation system 1 and telecommunication signals on fibre 7. Alternatively, separation can be achieved by using other detectors with different characteristics as long as the wavelengths of the telecommunications network transmitters and the wavelengths of the light generation system 1 differ enough, meaning that one of them falls clearly above and the other clearly below 1000 nm.

Additional separation of measurement and communication signals can be achieved by addressing OM4 multi-mode optical fibre with mode multiplexers, thus enabling independent access to, for example, linearly polarized LP01 and LP11 modes. In this case, mode multiplexers can be placed at different ends of the optical fibre 7. The transmission system should be connected to an appropriate pair of multiplexer outputs using the LP01 mode. The measurement system should be connected to an input using the LP11 mode. One can simultaneously carry out the transmission by means of data communication devices, in mode LP01, and the measurement in mode LP11—by means of a measurement system according to the invention.

The multi-mode optical fibre of the telecommunications network 7 is a measuring optical fibre in which light from the light generation system 1 is scattered. The scattering result returns to the fibre-optic measurement system, passes through the selective mode device 5 providing sufficient visibility W and is subject to interference and detection in the receiving system 2.

When connecting a fibre-optic measurement device according to the invention to the telecommunications network 7 as described above, standard cleaning of fibre-optic connectors and checking the condition of the network 7 are required. Network inspection can be carried out by means of an optical reflectometer. Such inspection allows the detection of damage or non-functioning connectors. In addition, as with any COTDR device connection, it may be necessary to adjust the output power level to avoid the appearance of non-linear phenomena in the optical fibre 7. Power adjustment can be done by modifying power supply parameters of optical amplifiers or changing settings of other parts of the system. An appropriate power level can be selected on the basis of the visibility check of the measurement signal recorded at the receiving system's 2 detector as a function of time.

The measurement system is equipped with the processing unit 9 for controlling the light generation system 1 and receiving and processing the signal from the receiving system 2. Using the processing unit 9, the COTDR measuring technique for measuring changes in the optical distance and converting them into temperature changes is implemented as described in Y. Koyamada, M. Imahama, K. Kubota, and K. Hogari, "Fiber-Optic Distributed Strain and Temperature Sensing With Very High Measure and Resolution Over Long Range Using Coherent OTDR," J. Light. Technol. 27, 1142-1146. This solution can be used in particular for temperature measurement in a server room. Server rooms are equipped with network infrastructure. At the same time, changes in the optical distance within optical fibre infrastructure in server rooms are mainly caused by temperature changes due to the marginal presence of other environmental exposures causing such changes as changes in pressure or strains. Measurement with an accuracy of 1° requires the use of a wavelength step when tuning the light generation system 1 that is less than or equal to 500 MHz. The step is understood as minimum applied change in the pulse frequency.

Figure 1B:
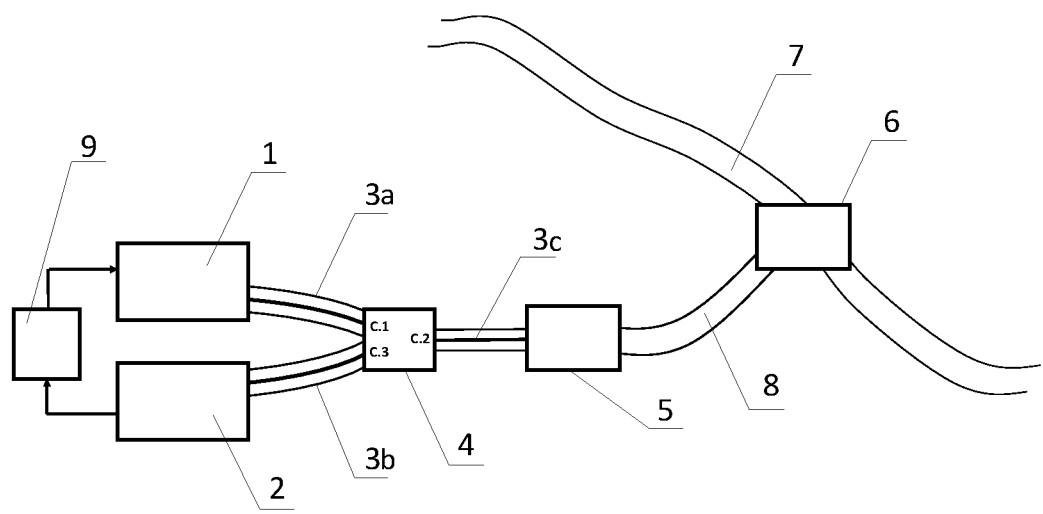
FIG. 1B shows a block diagram of an alternative embodiment of a fibre-optic measurement system according to the invention.

FIG. 1B shows a block diagram of an alternative embodiment of a fibre-optic measurement system according to the invention. The fibre-optic measurement system according to the invention can be also plugged in the telecommunications network in a situation where multi-mode telecommunication optical fibres are not terminated with a convenient connector. In this case, the fibre-optic measurement system is equipped with the coupler 6 attached through the section of optical fibre 8 of the selective mode device 5. The coupler 6 is plugged in the optical fibre 7 of the telecommunications network as shown in FIG. 1B.

In accordance with the invention, as shown in FIG. 1B, a structure and method of adaptation of a multi-mode optical fibre of a fibre-optic telecommunications network into a measurement system is provided. To enable multi-mode operation, the network 7 should be equipped with an optical fibre with a core diameter of 20 μm or more per measurement and communication system. The adaptation consists in connecting to the optical fibre 7 of the telecommunications network a fibre-optic measurement system according to the embodiment of the invention shown in FIG. 1A, FIG. 1B or FIG. 1D. The optical fibre 7 is then a sensing optical fibre, forming the sensor together with the measurement system. In particular, matching connectors can be connected and a solution can be obtained in which the fibre-optic measurement system according to the invention is attached to the end of the optical fibre 7—as shown in FIG. 1A, or the coupler 6 can be plugged in the optical fibre 7, thus obtaining the configuration shown in FIG. 1B. In both cases, the optical fibre 7 of the telecommunications network becomes a sensing optical fibre. The measuring optical fibre 7 is connected via the selective mode device 5 to the optical path of the fibre-optic measurement system equipped with the controlled light generation system 1 and the receiving system 2 connected by means of the directional device 4.

Figure 1C:
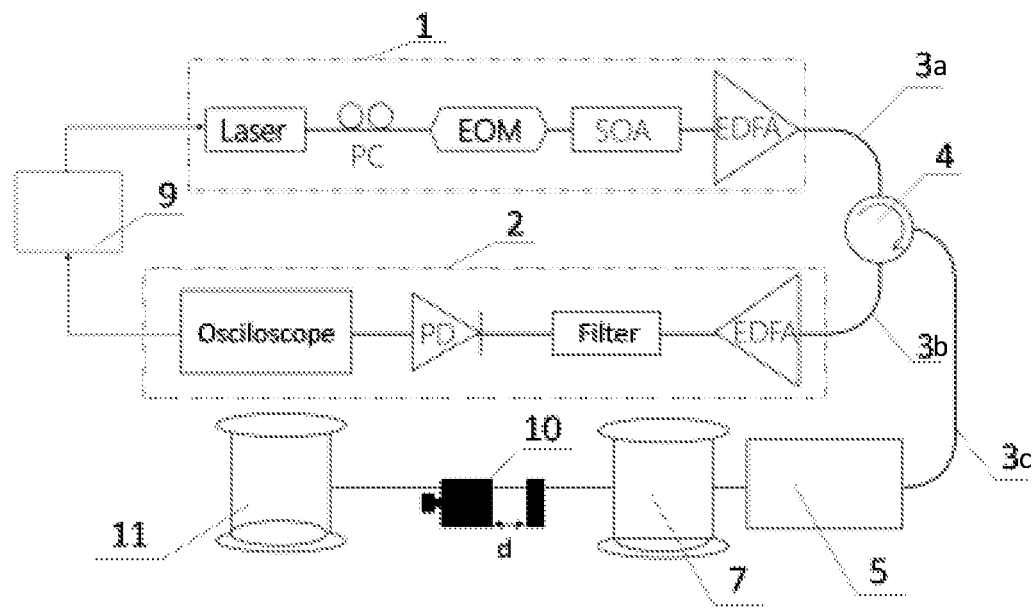
FIG. 1C shows a schematic diagram of the test measurement system.

For testing with typical multi-mode telecommunication optical fibres, a fibre-optic measurement system was created according to the invention, the schematic diagram of which is shown in FIG. 1C. The light generation system 1 comprises a laser, a polarization controller PC, the electro-optic modulator EOM, and the semiconductor optical amplifier SOA in the pulse generation system, and the optical amplifier EDFA.

The receiving system 2 comprises an oscilloscope with a detector PD equipped with a spectral filter and optical amplifier EDFA at the input.

The light generation system 1 and the receiving system 2 are connected via the circulator 4 to whose third port via a single-mode optical fibre 3 the selective mode device 5 is connected. The selective mode device 5 is connected to the sensing optical fibre 7 in which a strain application system 10 is provided in the form of a micrometric table with an adjustment range of 25 mm and a handle 300 mm away from the table. At the end of the sensing optical fibre remains a free section 11 that is 10 meters long.

The light generation system 1 is controlled by the processing unit 9. This unit 9 is also used to receive and process data from the oscilloscope of the receiver 2.

In order to check the sensitivity of strain measurements carried out on three few-mode and one multi-mode optical fibres, a high resolution φ-OTDR system was built, similar to the one presented in Y. Koyamada, M. Imahama, K. Kubota, and K. Hogari, "Fiber-Optic Distributed Strain and Temperature Sensing With Very High Measurand Resolution Over Long Range Using Coherent OTDR," J. Light. Technol. 27, 1142-1146.

As the sensing optical fibre 7, 4 km of OM4 optical fibre, 1 km of Draka 6LP optical fibre, and 100 m of InPhoTech 4LP optical fibre were tested.

The system was additionally extended with a selective mode device 5 in the form of a higher-order mode filter (HOMF) executed as per the description in L. Chorchos, J. P. Turkiewicz, L. Szostkiewicz, M. Napierala, L. Ostrowski, B. Bienkowska, and T. Nasilowski, "Passive higher order mode filter for 850 nm multimode fiber transmission," Microw. Opt. Technol. Lett. 59, 1959-1962 (2017).

In the light generation system 1, a distributed feedback (DFB) laser working at 1550 nm was used. The laser's characteristics of the wavelength adjustment by changing the power supply current was measured before the measurements were started. The tuning range was 29 GHz, higher resolutions can be achieved using a wider range. In order to correctly measure changes in radiation intensity for each point of the optical fibre as a function of laser tuning, the wavelength step during tuning was 92 MHz. This has provided an adequate wavelength scan, which is necessary for the correct measurement of temperature or strain, better accuracy of determination of spectral shift, and in consequence, measurements can be obtained with a smaller step. However, the measurement time increases with smaller laser length steps. For example, a step of 92 MHz translates into a temperature measurement accuracy of 0.2°. To obtain an optical pulse of 2 ns, an electro-optic modulator (EOM) was used. The semiconductor optical amplifier (SOA) used as an optical shutter—a pulse generation system—was synchronized with the EOM in order to obtain an extinction coefficient of 60 dB, which allowed us to obtain a spatial resolution of 20 cm on a 5 km long optical fibre. Typically, to generate a pulse, one needs a continuous source, a short electric pulse generator and an element that modulates the light intensity at the output according to the set pulses. Such an element can be a SOA or an EOM or both at once. The SOA and EOM in the "closed" state let some light through. The ratio of power transmitted in the "open" state to power transmitted in the "closed" state is called the extinction coefficient. The higher this value, the more the pulse is distinguishable from noise. The serial connection of the SOA and EOM modulators provides a resultant extinction coefficient that is higher than for each of them separately. These devices must be synchronized so that the pulse emitted by one of them is not cut by the other. To increase the pulse power, the optical amplifier (EDFA) was used.

The optical pulse was fed into the sensing optical fibre via the directional device 4, a circulator, and the selective mode device 5. In this embodiment, the selective mode device 5 was a mode filter. Without a mode filter, the pulse propagating in a multi-mode optical fibre would excite all modes. In order to avoid such an effect, a higher-order mode filter (HOMF) was used, which allowed us to filter higher-order modes and excite only the basic mode. An $M^2$ (beam propagation ratio or beam quality factor) test was performed to check the filter for proper operation. For each optical fibre, the value obtained was less than 1.1. In the absence of strong disturbances in the fibre-optic structure, the optical power is propagated only in the selected mode; there is no power dissipation from the basic mode to higher-order modes due to their orthogonality. As a result of Rayleigh scattering, part of the power of the pulse propagating in the optical fibre is reflected back from each point to all modes propagating in the measured optical fibre. The returning signal is filtered again by the mode filter—this results in a higher visibility W.

The return signal is then amplified by the second optical amplifier in the receiver 2 to increase the signal-to-noise ratio. To filter out the noise of spontaneous emission (ASE), a tunable filter with a spectral width of 1 nm was used in the system. The signal was recorded by the receiving system 2 implemented in the form of an oscilloscope equipped with a 1 GHz DC detector. This detector bandwidth has allowed to maintain appropriate spatial resolution of the measurement; better resolutions can be achieved by using more wide-band detectors. In general, detectors with a band greater than 0.5 GHz have worked appropriately. The oscilloscope operated at a 4 GHz sampling rate.

In order to apply a known strain on the optical fibre, a system based on the micrometric table 10 was built, to which the sensing optical fibre 7 was connected at a place approx. 10 m away from its free end 11. The other end attached to the mode filter 5 was immobilized.

Measurements of fibre-optic strain consisted in recording data from two laser scans. The first scan was carried out on the unstrained optical fibre, the second one was performed after the strain of the optical fibre. For each point of the optical fibre, a cross-correlation value between wavelength and intensity has been calculated. Based on the maximum cross-correlation value, the laser wavelength shift was determined, which is related by linear dependence to the strain of the optical fibre.

The tests were carried out on three different optical fibres. The first were commercially available multi-mode optical fibres OM4 (Draka), in which 34 LP mode groups can propagate at a wavelength of 1550 nm. The next optical fibre was the 6 LP Graded Index by Draka. The last optical fibre tested was the 4 LP optical fibre manufactured by InPhoTech, with a core diameter of 24 All these optical fibres are characterized by a parabolic distribution of the refractive index. These optical fibres have been selected to test single-mode measurements on both few-mode and multi-mode optical fibres, often used for indoor communication and as short-distance telecommunication lines.

The invention was tested using a series of optical fibres of different diameters as the sensing optical fibre. The best results were obtained in the range from 45 to 55 μm, in particular 50 μm. Using a larger-diameter optical fibre, a longer range can be achieved due to the larger mode field, which allows for more power in the linear range of the sensing optical fibre 7 below the power values resulting in non-linear phenomena. Operation of an optical fibre with a 62.5 μm core was also tested. Ranges sufficient for measurements inside a single building can already be achieved with an optical fibre with a 20 μm core.

Figure 2:
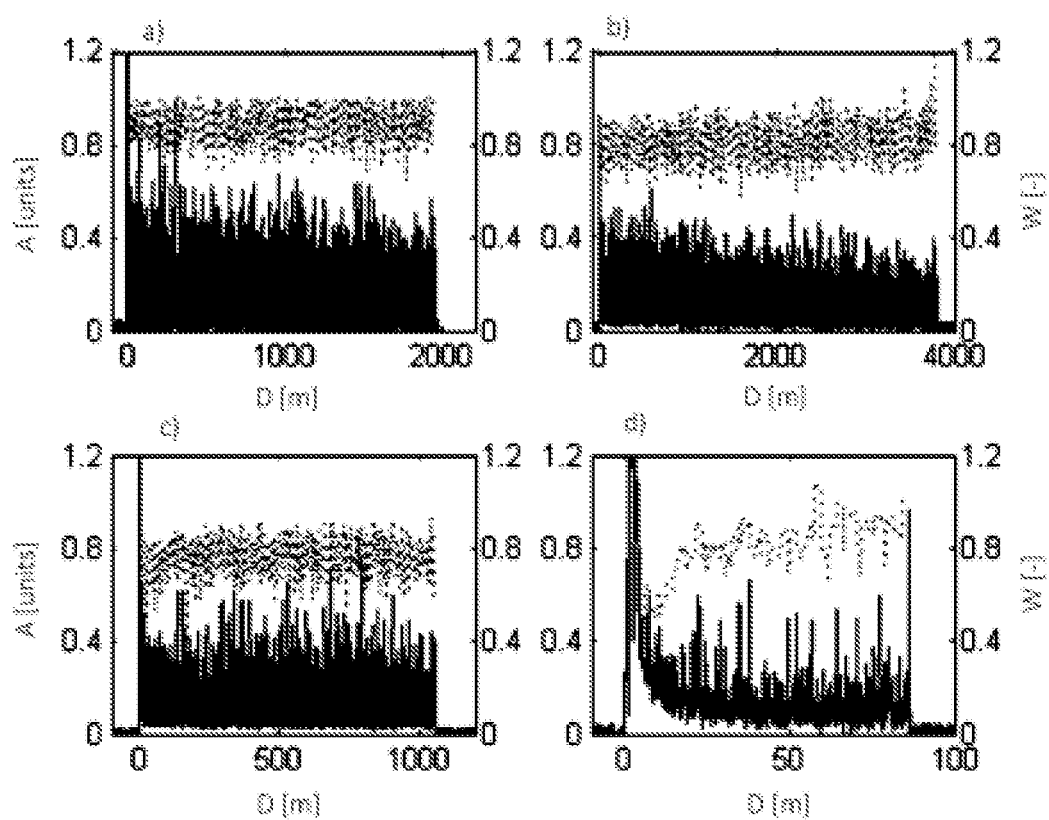
FIG. 2 shows the measurement signals marked with a continuous line and their visibility for 2 m sections marked with a dotted line for optical fibres a) SMF, b) Draka OM4, c) Draka 6LP, and d) InPhoTech 4LP.

For correct measurement using a φ-OTDR system on a single-mode optical fibre, the expected signal visibility should be at least 0.75. The visibility of the signal is defined as:

$$W = \frac{I_{max} - I_{min}}{I_{max} + I_{min}}$$

where $I_{max}$ and $I_{min}$ are the maximum and minimum signal intensities, respectively. In order to correctly characterize the system, visibility has been calculated for every 2 m of the sensing optical fibre. As you can see, for each section of the optical fibre, the visibility reaches values above 0.75, which proves the correctness of the measurement. FIG. 2 depicts optical fibre signals as a continuous line together with their visibility marked with a dotted line for each of the measured optical fibres in different fibres, the results of which are each shown in graphs a)-d). The results for few- and multi-mode optical fibres are similar to those for single-mode optical fibres.

FIG. 2 shows the measurement signals recorded using a detector, marked with a continuous line and their visibility for 2 m sections marked with a dotted line for optical fibres a) SMF, b) Draka OM4, c) Draka 6LP, and d) InPhoTech 4LP.

The visibility obtained for few-mode and multi-mode optical fibres is similar to that obtained for single-mode optical fibres.

Figure 3:
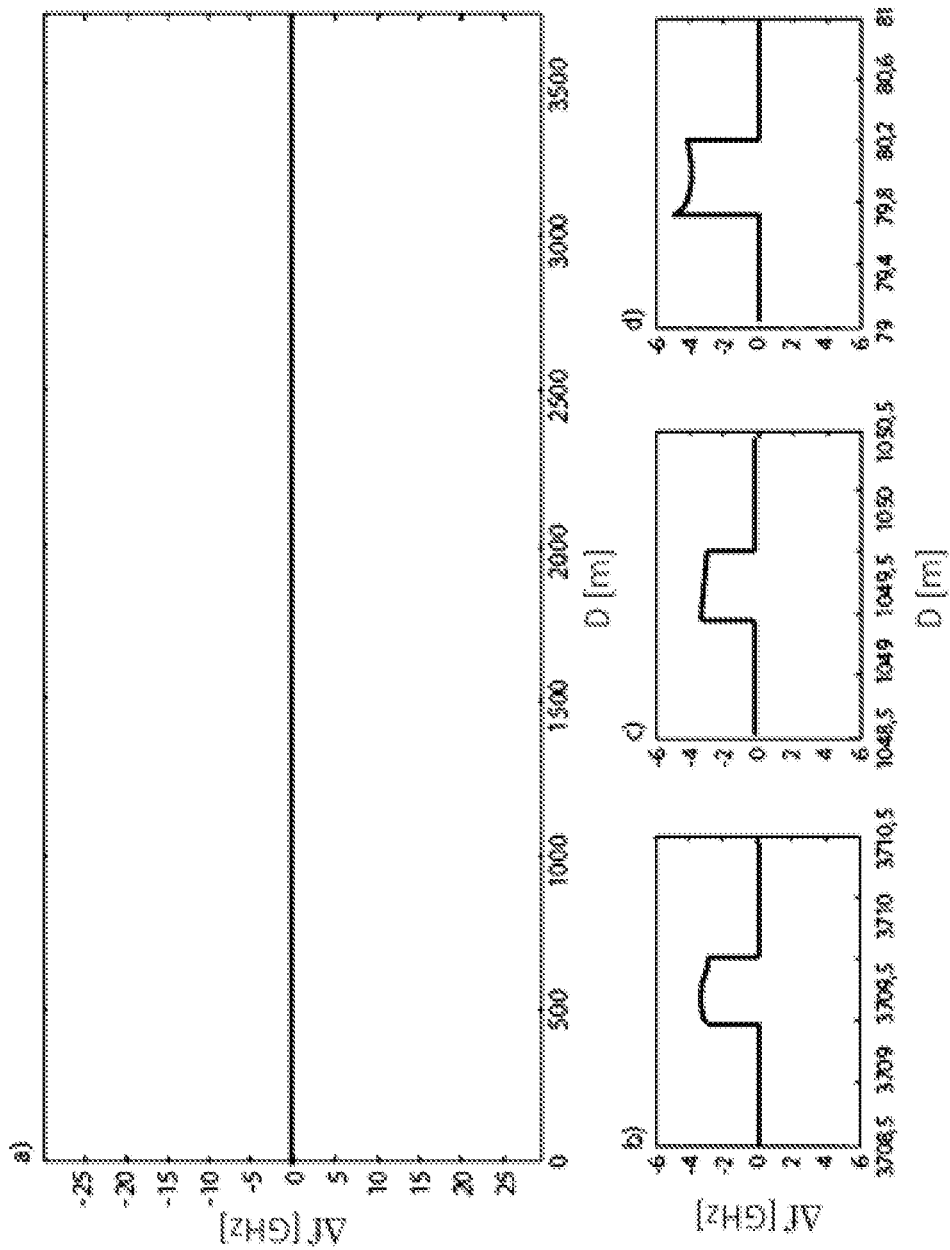
FIG. 3 shows the measured value of the frequency shift as a function of applied strain and linear match for optical fibres a) Draka OM4, b) Draka 6LP, and c) InPhoTech 4LP. The determined values of the sensitivity of measurements on the basic mode based on linear approximation are 138±16, 133±17 and 152±16 MHz/με, respectively.

The third step of the measurements was the analysis of the frequency shift introduced by changing the strain of the optical fibre on the tested section of the optical fibre. For each optical fibre, three measurements were collected for different strains. Two measurements have been carried out for each optical fibre and the strain given in order to verify the constancy of measurement conditions. For each pair of such measurements the wavelength shift for each point of the optical fibre is close to 0 GHz, which indicates the correctness and repeatability of the measurement. FIG. 3 shows a diagram of cross-correlation values as a function of optical fibre length and frequency shift. The plot presented in FIG. 3(*a*) shows the measurement data for the entire Draka OM4 optical fibre. FIGS. 3 (*b*), (*c*) and (*d*) present data only from sections strained in Draka OM4, Draka LP and InPhoTech 4 LP fibres, respectively. For all optical fibres, a shift of the maximum cross-correlation values for the strained section is clearly visible. At the same time, it can be seen that the shift only concerns the strained fragment and does not occur in the rest of the optical fibre. By measuring the shift of frequency between three different values of the set stress and adjusting the straight line to the obtained values, it was possible to determine the measurement sensitivity for measurements on the basic mode of all tested optical fibres. A measurement error has been identified in the measurements due to the laser length adjustment step. It is not possible to measure changes smaller than half a tuning step. All values obtained do not differ by more than the measurement error value from the sensitivity of a single-mode optical fibre (150 MHZ/με).

Figure 4:
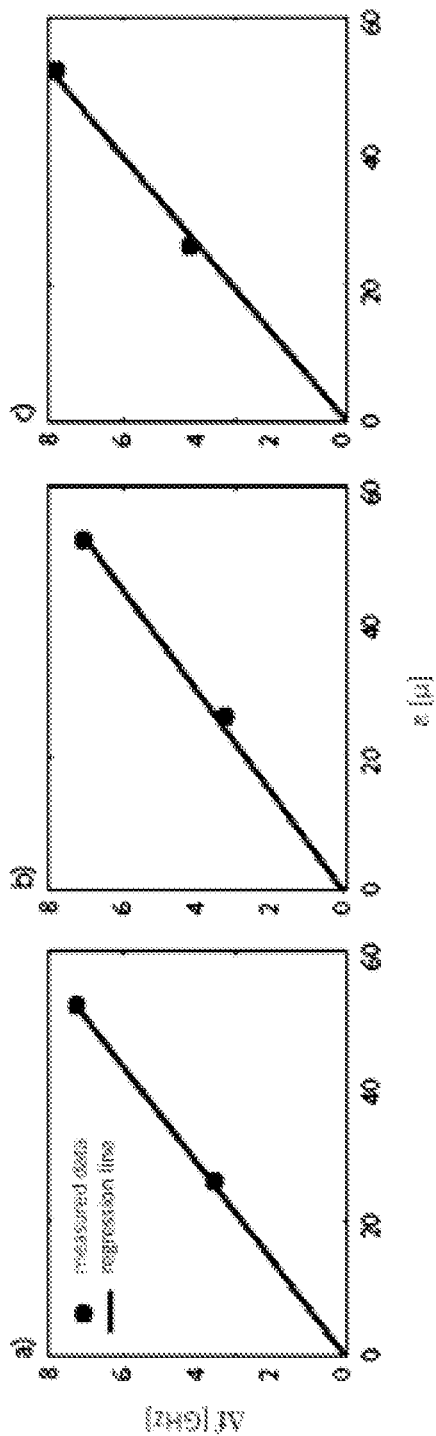
FIG. 4 shows the measured value of the frequency shift as a function of applied strain and linear match for optical fibres a) Draka OM4, b) Draka 6LP, and c) InPhoTech 4LP.

FIG. 4 shows the measured value of the frequency shift as a function of applied strain and linear match for optical fibres a) Draka OM4, b) Draka 6LP, and c) InPhoTech 4LP. The determined values of the sensitivity of measurements on the basic mode based on linear approximation are 138±16, 133±17 and 152±16 MHz/με, respectively.

The above embodiment shows a distributed strain measurement using the COTDR technique on multi-mode optical fibres that is unknown in the state of the art. Selective excitation of the basic mode and detection of the return signal from a single mode allows to carry out φ-OTDR measurements on existing and future multi-mode telecommunication lines.

The configuration described above allows obtaining a sensor system containing a light generation system with a tunable wavelength, controlled by a processing unit connected to the receiving system. The processing unit, the light generation system, and the receiving system can be located close to each other while the sensing optical fibre is placed further away 7. This only requires the use of a longer section of a single-mode optical fibre 3*a*, 3*b*, 3*c*.

This also allows obtaining a scalable system using multiple sensors and multiple sensing optical fibre placed in different locations.

The use of a different wavelength than the wavelength of the telecommunications network in the fibre-optic measurement system according to the invention makes it easier to ensure the coexistence of the sensor system in an existing telecommunications network. Thanks to this, measurements can be carried out without interrupting transmissions in the telecommunications network.

The result of the adaptation of a telecommunications network in accordance with the invention by connecting it to the fibre-optic measurement system according to the invention is the measurement system using the telecommunication optical fibre exclusively as a sensing optical fibre during the measurement—if the telecommunications devices are switched off during the measurement.

If, on the other hand, coexistence is ensured between the measurement system, transmitters, and receivers of the telecommunications network, a fibre-optic measurement and communication system is created for data transmission and for the determination of parameters—in particular temperature and strain. The network then has at least one operational telecommunications data transmitter and receiver connected to an optical fibre with a core of over 20 μm in diameter, allowing the use of multiple modes and higher power. The larger numerical aperture of the optical fibre with a larger core diameter allows for easier input of signals into the optical fibre, which simplifies the transmission system. At the same time, a larger mode field allows for more power to be used, which increases the maximal measurement distance of the system. This is preferable because it makes it possible to simultaneously measure more than one parameter using higher-order modes. This is even easier if one uses a core with a diameter of 25 μm, and better still, 47 μm or more.

The transmitter's wavelength differs from that of the light generation system 1 by at least 10 nm.

Separation of measurement and communication signals is easy if the transmitter operates—like typical transmitters—at a wavelength under 900 nm and the light generation system 1 is designed to operate at a wavelength greater than 1000 nm. This arrangement fits a significant percentage of communication networks.

The fibre-optic measurement system according to the invention operating at wavelength $\lambda 1$ can use existing multi-mode optical fibres used in building and inter-building telecommunications networks operating at wavelength $\lambda 2$, if the difference between $\lambda 1$ and $\lambda 2$ is greater than 10 nm. Connecting the measurement system to such an optical fibre allows to obtained a sensor in which the communication optical fibre acts as a sensing optical fibre. If $\lambda 2$ is a wavelength shorter than 900 nm and $\lambda 1$ is a wavelength longer than 1000 nm then, due to the need to use receiving systems made of different materials, the measurement signal will not be detected by the telecommunication system and the telecommunication signal will not be detected by the sensor system. If $\lambda 1$ and $\lambda 2$ are above 1000 nm, the separation of measurement and telecommunication signals is possible using a WDM coupler used in telecommunication to separate signals of different wavelengths. The minimum required difference for such a system of $\lambda 1$ and $\lambda 2$ is 10 nm. With the simultaneous coexistence and interaction of the sensor and communication systems according to the invention, a measurement and communication system is achieved.

For example, in a data transmission network in a multi-mode optical fibre equipped with VCSEL (Vertical Cavity Surface-emitting Lasers) light sources and silicon detectors at wavelength $\lambda 2=850$ nm, a sensor with multi-mode optical fibre 7 was used, equipped with a system for generating radiation equipped with a laser with a wavelength of 1550 nm. Thus, the lasers of the data network and the measurement system have wavelengths below 900 nm and above 1000 nm, respectively. In the data transmission network and in the measurement system, the appropriate detectors for their respective bands are used—in this embodiment—in the data transmission network, silicon detectors at 850 nm, and InGaAs indium-gallium-arsenide detectors at 1550 nm.

Figure 5A:
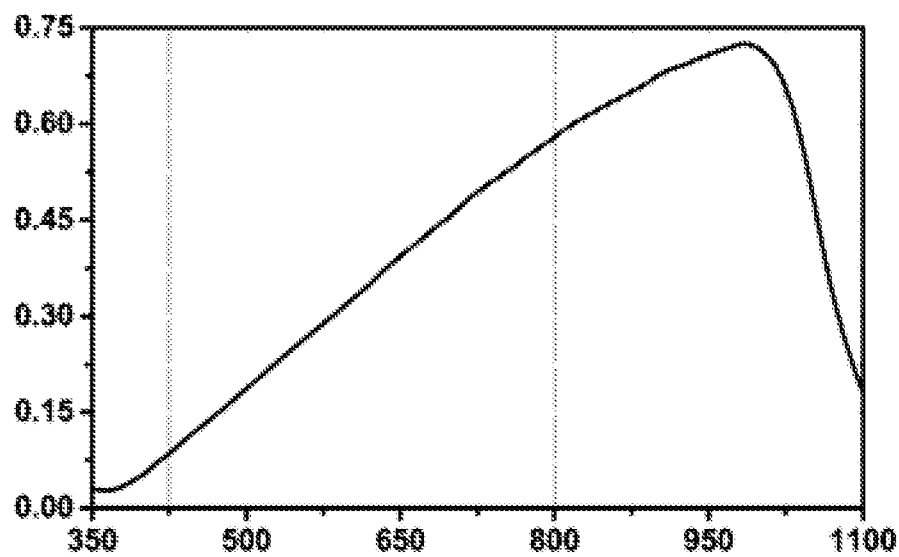
FIGS. 5A and 5B represent, respectively, sensitivities R as a function of the wavelength λ, of the communication network detector and the measurement system detector in some embodiments.
Figure 5B:
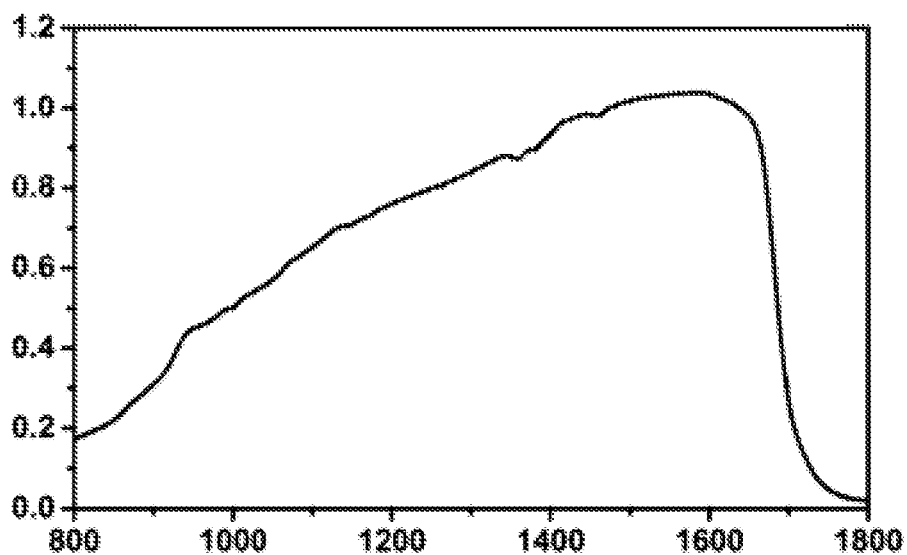

Plot of sensitivities R as a function of the k wavelength of the communication network detector and the measurement system 2 is shown in FIGS. 5A and 5B. The silicon detector has an operating range of about 400-1100 nm and the InGaAS detector has an operating range of 800-1700 nm. The detectors' operating ranges overlap in part, but the maxima of their responses are found in separate wavelength values. As a result, the source of the data transmission network operating at 850 nm has little influence on the response of the InGaAs detector in the receiving system 2 and the light generation system 1 does not interfere with the silicon detector of the telecommunications network. As a result, it is possible to obtain undisturbed simultaneous operation of the sensor and data transmission. Additional noise reduction can be achieved by using a 1300 nm high-pass filter in the sensor (not shown in the picture), which is connected to the path in series with the selective mode device 5.

Alternative embodiments use wavelength $\lambda 1$ of the light generation system 1 that is closer to wavelength $\lambda 2$ used in the data transmission network. The measurement signal was successfully filtered out from the transmission signal when the difference in wavelength $\Delta\lambda=|\lambda 1-\lambda 2|$ had been of at least 10 nm-preferably 50 nm.

If both $\lambda 1$ and $\lambda 2$ are greater than 1000 nm, it is difficult to use detectors which enable easy differentiation. Separation of measurement and telecommunication signals is possible using a WDM coupler used in telecommunication to separate signals of different wavelengths.

In this configuration, both the sensor and data transmission devices are connected to the sensing optical fibre 7 via couplers or WDM filters filtering the signal into separate channels. In the case of a sensor, the WDM coupler is placed between the selective mode device and the sensing optical fibre 7. The minimum required wavelength difference between the sensor and data transmission system is $\lambda 1 \geq 10$ nm.

For example, a multi-mode optical fibre in a data transmission system at wavelength $\lambda 2=1310$ nm can be used as the sensing optical fibre 7 of the sensor according to the invention equipped with a system for generating radiation 2 at wavelength $\lambda 1=1550$ nm. For such wavelengths, the difference between the light source used for transmission and the light source used in the sensor is 240 nm and both operate in the range above 1000 nm. In such cases a WDM filter is required for proper operation. Such filters should be applied at both ends of the optical fibre used. For the specified wavelengths, good results were obtained when the transmission devices were connected to channel 31 and the sensor to channel 55—channel designations were adopted according to ITU-T G.694.2. This configuration allows the sensor and the devices of the data communication network to operate without interruption.

A hybrid system can also be constructed using multi-mode multi-core optical fibres and exciting sensor and telecommunication signals in separate modes and/or separate cores.

The solution according to the invention is compatible with multi-mode networks and can be used as a sensor operating only on one of the fibre-optic modes.

A mode filter can be used to selectively increase the losses of higher-order modes. As a selective mode device 5, a holographic plate or a sequence of holographic plates can also be used. An embodiment of a good mode filter is also the object of US patent U.S. Ser. No. 10/502,897B2.

In some situations, the sensing optical fibre is exposed to changes in the optical distance because of more than one parameter. This is the case, for example, when the optical fibre is exposed to both vibrations and temperature changes. This makes measurement more difficult because then a linear equation with two unknown parameters needs to be solved and that is algebraically impossible. Cases where vibration and temperature occur simultaneously can be resolved with a use of frequency domain discrimination. Mechanical vibrations are associated with changes in the optical distance much faster than changes caused by temperature fluctuations. Frequency filtering by means of a low-pass filter of the signal representing changes in the optical distance as a function of time allows to obtain temperature-related changes and, frequency filtering by means of a high-pass filter—changes related to mechanical vibrations.

Measurement at a rate sufficient to determine the mechanical vibration frequency within the frequency ranges typically found in buildings is possible using a fixed-wavelength light generation system operating in pulse mode with a pulse repetition rate of 1 kHz or more. In such a system, changes over time in the behavior of the measurement signal on the detector are detected in successive measurements by successive pulses. Vibration frequency at a point of the sensing optical fibre 7 that corresponds to a given delay over time is determined by analyzing the changes in successive measurements with successive pulses. Measurement of the mechanical vibration frequency is important in assessing the harmfulness of construction works carried out in the vicinity of buildings. Such measurements generally do not require a good spatial resolution, single meters are good enough.

This approach is not always possible, for example, when measuring strain in buildings, in which case both temperature-related changes in length and strain-related changes in optical distance are slow-changing. The problem of solving one equation for two unknown parameters cannot be then solved using frequency filtration. The number of equations needs be increased. This can be done using more than one mode in measurements. The use of modes of different orders with different propagation coefficients enables simultaneous measurement of two parameters.

When measuring with two different modes, for the simultaneous measurement of two parameters, i.e. temperature and strain, a system of equations is obtained:

$$\begin{cases} \Delta n_{\mathit{eff}_1} = \left(\frac{dn}{dT}\right)_1 \Delta T + \left(\frac{dn}{d\varepsilon}\right)_1 \Delta \varepsilon & \text{mode } j = 1 \\ \Delta n_{\mathit{eff}_2} = \left(\frac{dn}{dT}\right)_2 \Delta T + \left(\frac{dn}{d\varepsilon}\right)_2 \Delta \varepsilon & \text{mode } j = 2 \end{cases}$$

where particular quantities mean:

$\Delta n_{\mathit{eff}_j}$ change in the effective refractive index of the j-th mode measured using change in the optical distance;

$$\left(\frac{dn}{dT}\right)_j$$

coefficient determined in the calibration, representing the change in the effective refractive index of the j-th mode influenced by temperature;

$$\left(\frac{dn}{d\varepsilon}\right)_j$$

coefficient determined in the calibration, representing the change in the effective refractive index of the j-th mode influenced by strain;

$\Delta T$ temperature change;

$\Delta \varepsilon$ relative change in length representing strain.

In a appropriately calibrated measurement system, this system is a system of two equations with two unknown parameters, solvable when the determinant is different from 0:

$$\left(\frac{dn}{dT}\right)_2 \left(\frac{dn}{d\varepsilon}\right)_1 - \left(\frac{dn}{dT}\right)_1 \left(\frac{dn}{d\varepsilon}\right)_2 \neq 0$$

The solution of the equation system allows two unknown parameters under test.

In embodiments where more parameters are set and more modes are used—to be precise: J-parameters and J-modes having different effective refractive indices and reacting differently to environmental factors, which represent the parameters to be measured (for example: strain, pressure, temperature, radiation), the condition for solving the system is a non-zero determinant of the measurement matrix $M_{p[J \times J]}$.

$$M_p = \begin{bmatrix} \frac{dn_1}{dp_1} & \cdots & \frac{dn_j}{dp_1} \\ \vdots & \ddots & \vdots \\ \frac{dn_1}{dp_k} & \cdots & \frac{dn_j}{dp_k} \end{bmatrix}$$

where $$\frac{dn_j}{dp_k}$$

is a change in the effective refractive index of the j-th mode under the influence of the k-th physical quantity. While $j \in \{1 \ldots J\}$ and $k \in \{1 \ldots J\}$ In embodiments where more parameters are determined (K-parameters) and more modes are used (J-modes), having different effective refractive indices and responding differently to environmental factors representing the parameters to be measured, the measurement matrix is not square. The condition for the system's solvability is $J \geq K$ and a non-zero determinant of the matrix that is the product of the measurement matrix and its transposition $M_{p[K \times J]} \times M_{p[K \times J]}^T$.

$$M_{p[K \times J]} = \begin{bmatrix} \frac{dn_1}{dp_1} & \cdots & \frac{dn_J}{dp_1} \\ \vdots & \ddots & \vdots \\ \frac{dn_1}{dp_K} & \cdots & \frac{dn_J}{dp_K} \end{bmatrix}$$

where $$\frac{dn_j}{dp_k}$$

is a change in the effective refractive index of the j-th mode under the influence of the k-th physical quantity, while $j \in \{1 \ldots J\}$ and $k \in \{1 \ldots K\}$, and $J > K$.

The measure of the quality of a measuring optical fibre is the value of the determinant of matrix $M_p \times M_p^T$, where element $$\frac{dn_j}{dp_k}$$

is a change of the effective refractive index of the j-th mode under the influence of the k-th parameter. Maximizing the determinant of the presented matrix minimizes the error of distinguishing individual parameters, resulting from the numerical propagation of the measurement error of determining the change in the effective refractive index of individual modes.

Measurement that utilizes many measurement modes requires the use of a controlled selective mode device 5.

An example of such a device can be a mode multiplexer. This device has one output executed by means of a few-mode or multi-mode optical fibre. In addition, it has several or dozen or so inputs. The number of inputs depends on the number of modes addressed by this device. Input optical fibres can be single-mode optical fibres. The operation of a mode multiplexer consists in introducing light from a given input into the appropriate mode channel of a multi-mode optical fibre. With some accuracy, it can be assumed that the channels are addressed independently and energy is only introduced into the selected mode. The device works analogously also in the other direction, filtering the signal from the multi-mode optical fibre, dividing it into appropriate modes, the energy of which is supplied by the respective inputs.

Figure 1D:
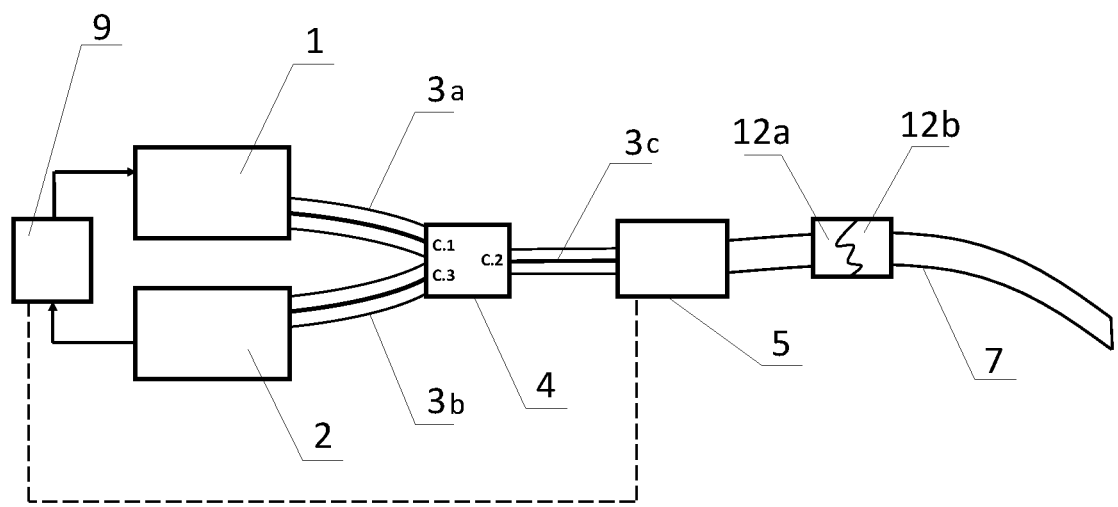
FIG. 1D shows a schematic diagram of an alternative embodiment of a measurement system according to the invention.

In the embodiment of the shown in FIG. 1D, the selective mode device 5 is controlled and connected to a processing unit 9 and is adapted to of successive excitation of modes of different orders. The processing unit is adapted to determining temperature and strain, in the measurement by means of at least two modes of different mode orders and of controlling the selective mode device 5. It is preferable to use a programmable processing unit 9, then the tasks of controlling and determining the measurand based on the measurement signal and calibration data can be solved by a computer program running on the processing unit 9.

The optical fibre of a building's telecommunications network usually runs through a significant part of the height of the building and is rigidly bound to its structure at least in several points. Thus, the adaptation of the telecommunications network to the measurement network and its use as a sensing optical fibre 7 and eliminating the influence of temperature allows to obtain a measure of strain in the building.

Even better results can be achieved if the optical fibre is also designed to perform a sensing function from the beginning. The optical fibre can then be attached at convenient design points and pre-tensioned to allow measurement even when the distance between the points is reduced (loosened).

During changes in building geometry, the sensing optical fibre changes its length together with the structure, which translates directly into a measurable change in optical fibre strain. With a known distribution of the optical fibre in the building and the possibility of locating a change in the optical fibre strain, the distributed measurement enables us to properly interpret the data and simulate the building strain.

Thanks to this action, the device can be used in place of a mode filter. In this case, the measurement system is connected to the selected input of the multiplexer (for example, to the input corresponding to the basic mode LP01), and the sensing optical fibre is connected to the multiplexer output. In this case, the multiplexer works like a mode filter, enabling correct measurement. After performing a measurement on the first selected mode, it is possible to reconnect the measurement system to another input that corresponds to another mode (one of the higher-order modes, for example LP 11). After such a configuration change, the measurement can be performed again.

Switching can be done manually by the user or can be automated by using an automatic fibre-optic switch together with a control system. For example, a standard MEMS-based switch in 1×2 configuration (one input, two outputs) can be used. The measurement system in this case is connected to the switch input and the two selected multiplexer inputs are connected to the outputs of this switch. Using the switch's control system, the switch can be set to one of the positions for basic mode measurements, and then switched to a position for higher-order mode measurements. The system can be coupled with the pulse generation and processing system of the measuring device.

The use of a mode multiplexer enables the measurement of two optical fibre modes, and then the comparison of the results obtained. If the selected modes belong to different mode groups, their effective refractive indices vary. The coefficients of temperature sensitivity and stress sensitivity are also different. By measuring the same physical change—a change in temperature or strain—on two fibre-optic modes, it is possible to create a system of equations. By solving this system, it is possible to independently determine each of the mentioned quantities.

Another application of the system described in the embodiment is to measure the differences in the effective refractive indices of modes, which can be used, for example, during the characterization of optical fibre.

One of the embodiments of technical implementation of the idea of a mode multiplexer is the use of a sequence of holographic plates. It is possible to create a mode multiplexer which enables independent access to six modes of the Draka 4 LP multi-mode optical fibre manufactured by Prysmian group. An important parameter of a mode multiplexer is the level of energy that is introduced into modes other than those addressed by a given input. In the case of holographic plate technology, it is possible to obtain the ratio of power introduced to other modes to the power introduced to the selected mode at −15 dB, e.g. PROTEUS-S. In practice, it means that correct measurement on addressed modes using a multiplexer made using this technology is possible.

Another embodiment of selective mode excitation is the use of asymmetric couplers, as disclosed, among other things, in Q. Huang, Y. Wu, W. Jin and K. S. Chiang, "Mode Multiplexer With Cascaded Vertical Asymmetric Waveguide Directional Couplers," in *Journal of Lightwave Technology*, vol. 36, no. 14, pp. 2903-2911, 15 Jul. 15, 2018, doi: 10.1109/JLT.2018.2829143. In this case, the device is based on a sequence of optical fibre couplers made in such a way as to enable independent excitation of modes, although in the simplest case, one would be sufficient. The device can have one single-mode optical fibre input and two independent multi-mode optical fibre outputs. One mode is excited in each of the outputs, for example, the LP01 basic mode and the LP11 higher-order mode—e.g. from KS PHOTONICS. When using this solution, the measurement system is connected to the input port. The sensing optical fibre should be connected to one of the output ports. After the measurement of the selected mode, the sensing optical fibre must be switched to the second multiplexer output.

The advantage of using this solution is the possibility of making measurements on several modes using a relatively simple multiplexer.

The disadvantages of this solution include the low coupling efficiency of 80% compared to 97% for the example solution with holographic plates and the need to use much more difficult to access multi-mode switches with respect to the automation of measurement.

Depending on the application, processing units 9 adapted to the implementation of various measurement techniques and dedicated components of the measurement system are used.

The COTDR technique requires a narrow spectral source—with the possibility of tuning the central wavelength—for measurement. To perform a full measurement, it is necessary to send several or several dozen—depending on the required measurement range of temperature or strain—pulses with a different central wavelength. The tuning takes place between the pulse generation and does not have to be done continuously.

The disadvantage of this solution is the low measurement speed—one measurement can last up to one minute. Due to the fact that at least a few scattered pulses have to be collected for a single measurement, the technique is not very convenient to monitor rapidly changing phenomena such as vibrations or temperature changes of several K/min.

Measurement using the COTDR technique can be carried out with relatively high spatial resolutions on the order of 10 cm and even single-digit cm at distances on the order of kilometres or even tens of kilometres.

Measurement using this technique allows referring to a reference measurement so that the measurement can be carried out periodically. Continuous measurement of the building is not required to determine its strain. For measuring the strain of buildings and the temperature in the server room, due to the rather slow changes in both parameters, this technique is the optimal choice.

The Chirp-OTDR technique is a special case of COTDR. The measurement uses light pulses in which the central wavelength is tuned during the emission of a single pulse. The advantage of this technique is the possibility of quantitative measurement of a selected parameter in a single shot. The disadvantage is that the COTDR has a lower spatial resolution of a few meters—because the pulse cannot be so short, as it has to last long enough for the wavelength tuning process to be performed. Tuning the source's wavelength during the pulse also requires a more complex source layout, because synchronization, measurement, and linearity correction of the tuning are required.

The OFDR technique is based on frequency domain data analysis. It requires a linearly tunable laser to operate. In practice, an additional reference interferometer should be used to compensate for minor source tuning non-linearities, making the system more complex and vulnerable to environmental vibration. The disadvantage of this technique is also the duration of measurement. During one measurement, the laser has to adjust the central wavelength, which is done at a limited speed. This means that the measurement can take up to several seconds. This makes the technique suitable only for measuring slow-changing phenomena, without vibrations or other environmental disturbances. The advantage of this technique is that the measurement has a very high spatial resolution on the order of millimetres.

The invention allows to extend the functionality of multi-mode fibre-optic networks used in buildings beyond data transmission and use them as sensors. The results of the conducted tests allow us to use the COTDR technique to measure strain of the structure of a building, especially in tall buildings, exposed to high strain due to strong gusts of wind, or to measure temperature in data centres.

A fibre-optic telecommunications network means a fibre-optic infrastructure that can be used to transmit information using changes in the modulation of light transmitted through it. This group comprises, in particular, telecommunication cables and optical fibres permanently installed in facilities and cables and optical fibres which may be used for, or are intended to be used for, telecommunications applications. Telecommunication optical fibre is understood to mean any optical fibre that can be used to transmit a signal.

A person skilled in the art will note that the scope of the invention includes not only devices that make measurements on the basis of a light signal resulting from Rayleigh scattering, but also solutions using Brillouin or Raman scattering.

The invention claimed is:

1. A fibre-optic measurement system, comprising:
   a controlled light generation system coupled via a first optical path to an input of a directional device;
   a receiving system connected via a second optical path to an output of the directional device;
   a processing unit for receiving and processing a signal from the receiving system and for implementing an OFDR and/or COTDR measurement technique for measuring changes in an optical distance and processing them into at least one parameter;
   a selective mode device for single mode detection of backscattered light coupled via a third optical path to the directional device;
   wherein the first optical path, second optical path, and third optical path are all single mode fibres;
   wherein the selective mode device is configured to be connected to a multi-mode fiber of a fibre-optic infrastructure; and
   wherein the processing unit is configured to control the controlled light generation system, and the selective mode device is configured to selective excitation of a single mode in the multi-mode fibre of the fibre-optic infrastructure to determine an optical distance of the multi-mode fibre.

2. The fibre-optic measurement system according to claim 1, wherein the selective mode device is a mode filter.

3. The fibre-optic measurement system according to claim 1, wherein the selective mode device is a selective mode excitation system for successive excitation of different modes.

4. The fibre-optic measurement system according to claim 1, wherein the selective mode device is configured to selectively increase losses of higher-order modes.

5. The fibre-optic measurement system according to claim 1, wherein the selective mode device is at least one holographic plate.

6. The fibre-optic measurement system according to claim 1, wherein the selective mode device is a system of asymmetric couplers.

7. The fibre-optic measurement system according to claim 1, wherein the processing unit has a frequency filtering module for filtering the measured optical distance.

8. The fibre-optic measurement system according to claim 1, wherein the selective mode device is controlled and connected to the processing unit and is configured to successive excitation of modes of different orders, while the processing unit is configured to determine at least two parameters in the measurement by at least two modes of different orders.

9. The fibre-optic measurement system according to claim 8, wherein the processing unit is configured to determine two parameters in the measurement by at least three modes of different orders.

10. The fibre-optic measurement system according to claim 1, further comprising a coupler and an optical fibre section for connecting to the fibre-optic infrastructure.

11. A method of utilizing a telecommunication optical fibre in a fibre-optic infrastructure by an optical measurement system to conduct measurements, comprising:
    connecting a light generation system to a directional device via a first optical path;
    connecting a receiving system to the directional device via a second optical path;
    connecting the directional device to a first end of a selective mode device via a third optical path, wherein the selective mode device is configured to allow a selective excitation of a single mode;
    wherein the first optical path, second optical path, and third optical path are all single mode fibres;
    connecting a second end of the selective mode optical device to a multi-mode fibre of a fibre-optic infrastructure;
    providing, by the light generation system, through the direction device and selective mode optical device, into the multi-mode fibre of the fibre-optic infrastructure, a single mode light signal;
    detecting, via the receiving system, backscattered light of the single mode light signal; and
    determining, via a processing system coupled to the receiving system, based on detecting backscattered light, an optical parameter of the multi-mode fibre of the fibre-optic infrastructure.

12. The method according to claim 11, wherein connecting the second end of the selective mode optical device to a fibre-optic infrastructure comprises coupling the second end of the selective mode optical device to a fibre-optic infrastructure through a coupler and an optical fibre section.

13. A fibre-optic measurement and communication system for data transmission and for determination of a parameter representing a physical quantity, comprising:
    at least one fibre-optic measurement system, having:
        a controlled light generation system coupled via a first optical path to an input of a directional device;
        a receiving system connected via a second optical path to an output of the directional device;
        a processing unit for receiving and processing a signal from the receiving system and for implementing an OFDR and/or COTDR measurement technique for measuring changes in an optical distance and processing them into at least one parameter;
        a selective mode device for single mode detection of backscattered light coupled via a third optical path to the directional device;
        wherein the selective mode device is configured to be connected to a fibre-optic infrastructure; and
        wherein the processing unit is configured to control the controlled light generation system, and the selective mode device is configured to selective excitation of a single mode in the fibre-optic infrastructure;
    a telecommunication network including:
        a telecommunication optical fibre having a core of at least 20 μm in diameter;
        a transmitter coupled to the telecommunication optical fibre;
        a receiver coupled to the telecommunication optical fibre;
    wherein the transmitter of the telecommunication network and the controlled light generation system of the at least one fibre-optic measurement system each produce light that differ by at least 10 nm from each other.

14. The fibre-optic measurement and communication system according to claim 13, wherein the telecommunication optical fibre has a core diameter of at least 47 μm.

15. The fibre-optic measurement and communication system according to claim 13, wherein the transmitter operates at a wavelength 900 nm or less and the light generation system operates at a wavelength at least 1000 nm.

* * * * *